United States Patent [19]
Kiyonaga et al.

[11] Patent Number: 6,025,904
[45] Date of Patent: Feb. 15, 2000

[54] IMAGE FORMING APPARATUS HAVING OPTICAL EXPOSURE UNIT AND DIGITAL EXPOSURE UNIT

[75] Inventors: Yutaka Kiyonaga; Motoaki Murakami, both of Wakayama, Japan

[73] Assignee: Noritsu Koki Co., Ltd., Wakayama-ken, Japan

[21] Appl. No.: 09/069,302

[22] Filed: Apr. 29, 1998

[30] Foreign Application Priority Data

Apr. 30, 1997 [JP] Japan ..................................... 9-112441
Oct. 28, 1997 [JP] Japan ..................................... 9-295312

[51] Int. Cl.[7] ............................ G03B 27/52; G03B 27/32
[52] U.S. Cl. ................................. 355/41; 355/40; 355/27
[58] Field of Search ................................. 355/67, 40, 41, 355/27, 28, 29

[56] References Cited

U.S. PATENT DOCUMENTS

5,432,579  7/1995  Tokuda ....................................... 355/77
5,734,461  3/1998  Ishikawa et al. ........................... 355/40
5,812,176  9/1998  Kawabe et al. ........................... 347/237

*Primary Examiner*—David M. Gray
*Assistant Examiner*—Hung Henry Nguyen
*Attorney, Agent, or Firm*—Fulbright & Jaworski, LLP

[57] ABSTRACT

An image forming apparatus includes an optical exposure unit for forming an image on photosensitive material by exposing the material with light beam generated from a first light beam source and transmitted through a photographic film; and a digital exposure unit for forming an image on the photosensitive material by exposing the material with light beam generated from a second light beam source according to digital image data. The optical exposure unit and the digital exposure unit share a single common exposure point. The optical exposure unit includes a masking mechanism for delimiting an exposure area on the photosensitive material, and this masking mechanism and a head module of the digital exposure unit are integrated together as a unit.

9 Claims, 12 Drawing Sheets

IMAGE FORMING APPARATUS HAVING OPTICAL EXPOSURE UNIT AND DIGITAL EXPOSURE UNIT

BACKGROUND OF THE INVENTION

1. Field of the Invention

The present invention relates to an image forming apparatus having an optical exposure unit for exposing photosensitive material with light beam transmitted through a photographic film and a digital exposure unit for exposing the photosensitive material with light beam irradiated according to digital image data.

2. Description of Related Art

An image forming apparatus noted above is known from e.g. Japanese laid-open patent gazette Hei. 9-73140. According to this apparatus, in a transporting path along which a print paper drawn out of a paper magazine is transported by a transport mechanism to a photographic developer unit, there are provided an optical exposure point where the print paper is exposed by the optical exposure unit and a digital exposure point where the paper is exposed by the digital exposure unit. The apparatus further includes a paper-loop forming section between the two exposure points, so that an exposure operation by the optical exposure unit and an exposure operation by the digital exposure unit may take place independently of each other.

The conventional construction described above requires two separate spaces for providing the two exposure points respectively. In association therewith, there is another requirement for providing two separate transport mechanisms for moving and aligning the print paper to and at the respective exposure points. These requirements will present significant difficulty in forming the apparatus compact if e.g. the apparatus is to be integrated as a printer processor within a mini laboratory system.

SUMMARY OF THE INVENTION

A primary object of the present invention is to overcome the above problem by providing an image forming apparatus which includes both an optical exposure unit for exposing photosensitive material with light beam transmitted through a photographic film and a digital exposure unit for exposing the photosensitive material with light beam irradiated according to digital image data, yet which may be formed compact.

For accomplishing the above object, an image forming apparatus, according to the invention, comprises an optical exposure unit for forming an image on photosensitive material at an exposure point by exposing the material with light beam generated from a first light beam source and transmitted through a photographic film and a digital exposure unit for forming an image on the photosensitive material at said exposure point by exposing the material with light beam generated from a second light beam source according to digital image data. With this construction, both the exposure of the photosensitive material by the optical exposure unit and the exposure of the material by the digital exposure unit take place at a single common exposure point. Hence, the apparatus requires only one exposure point as well as only one mechanism for transporting and aligning the photosensitive material to and at the exposure point to be shared by the two exposure lines. Consequently, with the absence of the additional space for accommodating those space and components dedicated for use by the digital exposure line, this apparatus may be formed compact.

As the light beam source (i.e. the first light beam source) for the optical exposure unit, traditionally, a halogen lamp has been used. Whereas, regarding the light beam source (i.e. the second light beam source) for the digital exposure unit, an LED cannot provide sufficient brightness for the blue or green component while a vacuum fluorescence print head ('VFPH') module used to be unable to provide sufficient brightness for the red component. For this reason, the convention, such as disclosed in Japanese laid-open patent gazette Hei. 8-192536, has suggested an apparatus using an LED dedicated to the exposure of red component in combination with a VFPH module dedicated to the exposure of the green and blue components. However, such combined use of different light emitting components as the LED and the VFPH module would present difficulty in achieving uniformity in the exposures of the three primary color components, due to e.g. the difference in their beam spread angles. In recent years, however, improvement has been achieved regarding VFPH for its brightness in the red wavelength range. Therefore, the present invention proposes an image forming apparatus whose digital exposure unit including, as the second light beam source, a VFPH module which has a first VFPH for red exposure, a second VFPH for green exposure and a third VFPH for blue exposure. With this construction, uniform exposure of the three primary colors may be expected, as all these color light components are generated by the VFPH's; and exposure control too may be simple accordingly. This invention's construction provides a further advantage of achieving manufacture cost reduction, in comparison with e.g. LED, since the VFPH, because of the manufacture method thereof, may be constructed as a linear array more easily than an LED.

According to a preferred embodiment of the present invention, the first VFPH, has an emission wavelength of 600–750 nm and the second and third VFPH's respectively have an emission wavelength of 400–580 nm. Thus, the color exposure VFPH module uses only such VFPH's as providing satisfactory performances.

When a linear array assembly such as the VFPH module described above is employed as the exposure light beam source, for forming a two-dimensional image on the photosensitive material, it is necessary for its exposing beam to be scanned also in the direction traversing the longitudinal direction of the linear array, i.e. in an auxiliary scanning direction. For this reason, according to one embodiment of the invention, the VFPH module is adapted to be movable along a transporting direction of the photosensitive material in order to expose the material located at the exposure point over a predetermined area of the material. That is, a two-dimensional image is formed on the photosensitive material as the VFPH module is moved for scanning over the material which is maintained still at the exposure point. The photosensitive material is maintained still at this same exposure position for exposure by the optical exposure unit also. So that the alignment and stoppage of the photosensitive material may be commonly utilized by both exposure units.

According to a further embodiment of the invention, the photosensitive material is moved for exposure relative to the VFPH module which is maintained still at said exposure point. This construction provides the advantage of allowing elimination of the mechanism for moving the VFPH module for scanning. In this case, a two-dimensional image may be formed by controlling the transport mechanism for transporting the photosensitive material to the exposure point in such a manner that the material may be transported in timed relationship with the necessary scanning operation in the auxiliary scanning direction.

In the case of the construction of the invention described above, the optical exposure unit and the digital exposure unit share the same single exposure point. This in turn means that consideration should be given to the lay-out of these optical and digital exposure units. Usually, the optical exposure unit is equipped originally with a masking mechanism for forming or delimiting an exposure area for the photosensitive material. Then, the present invention proposes that the VFPH module be incorporated or integrated within this masking mechanism. As a result, in addition to the above-described advantage of needing to provide only one exposure point for the exposure of the photosensitive material by the optical exposure unit and that by the digital exposure unit, the integration of the VFPH module with the masking mechanism provides a further advantage of allowing the two exposure lines to share the same single mechanism for transporting and aligning the photosensitive material to and at this exposure point. As a result, this construction allows the apparatus to be formed even more compact.

In the above construction, according to a further embodiment of the invention, the masking mechanism includes a width-wise masking member for determining the width-wise dimension of the exposure area and a feeding-wise masking member for determining the feeding-wise dimension of the exposure area, and the VFPH module is movable independently of movements of the width-wise and feeding-wise masking members. With this construction, the optical exposure unit and the digital exposure unit may be driven independently of each other. For instance, the apparatus with this construction, while being formed compact, may provide wide variety of printing functions for providing an optically exposed print having no-image-bearing margins by using only the optical exposure function with the masking mechanism, a digital print using the digital exposure function alone, or a composite print using both of the functions.

Preferably, the masking mechanism is detachably attached on a transporting path along which the photosensitive material is transported. This construction may facilitate the detachment and re-attachment of the masking mechanism and/or the VFPH module for the purpose of maintenance.

Further and other features and effects of the invention will become apparent from the following more detailed description relating to preferred embodiments thereof with reference to accompanying drawings.

DESCRIPTION OF THE PREFERRED EMBODIMENTS

A printer processor having an image forming apparatus of the invention will be described in details hereinafter with reference to the accompanying drawings.

Figure 1:
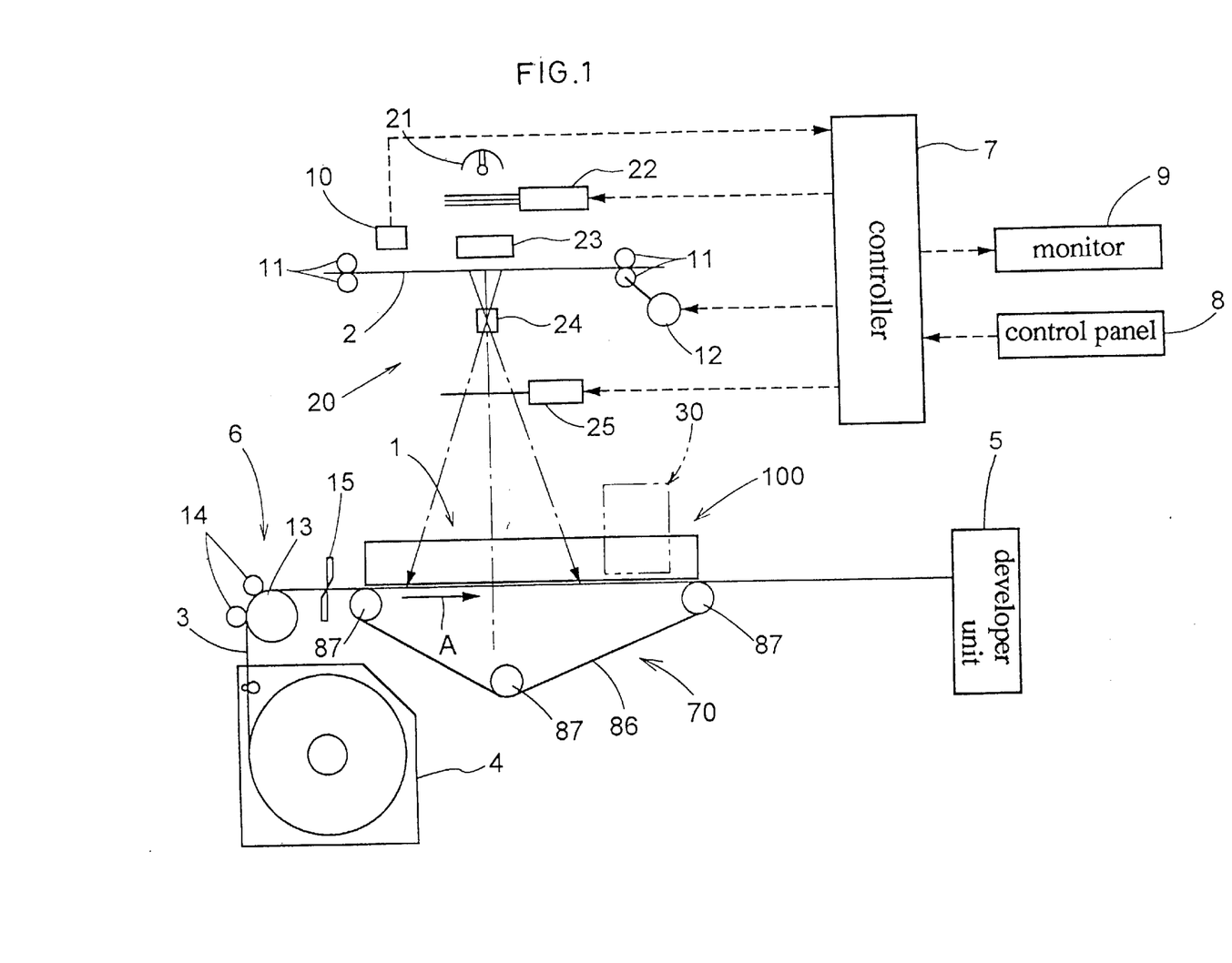
FIG. 1 is a schematic block diagram of a printer processor using an image forming apparatus according to the invention.

As may be apparent from a schematic block diagram shown in FIG. 1, the printer processor includes an optical exposure unit 20 for exposing, at an exposure point 1, a print paper 3 as a photosensitive material with an image of a photographic film 2 (hereinafter, 'film'), a digital exposure unit 30 for exposing, at the same exposure point 1, the print paper 3 with an image according to digital image data, a developer unit 5 for developing the print paper 3 exposed at the exposure point 1, a transporting mechanism 6 for transporting the print paper 3 from a print-paper magazine 4 to the developer unit 5 via the exposure point 1, and a controller 7 for controlling the above components of this printer processor 1. To the controller 7, there are connected a control panel 8 for inputting various data and a video monitor 9 for displaying images and/or characters.

First, the elongate print paper strip 3 is drawn out of the print-paper magazine 4 which contains the paper 3 in a rolled state. Then, the paper 3 is transported along a transporting path by advance rollers 13 and press rollers 14 to a cutter 15, by which the paper 3 is cut into pieces each corresponding to one frame of the film. Each cut paper piece is then exposed by either one or both of the optical and digital exposure units 20, 30 and then developed by the developer unit 5. This developed paper is then dried and discharged from the system. Under the transporting path, there is disposed an exposure table 70 including three rollers 87, and a conveyer belt 86 entrained about these rollers 87. Instead of the above construction, the elongate print paper 3 may be cut into the one-frame pieces immediately before being discharged from the system.

Next, the respective components of the processor will be described in greater details.

The optical exposure unit 20 includes an optical exposure light beam source 21 comprising a halogen lamp, a light modulating filter 22 for adjusting color balance of the light beam to be irradiated on the film 2, a mirror tunnel 23 for uniformly mixing the components of the light beam transmitted through the modulating filter 22, a printing lens 24 for forming an image of the film 2 on the print paper 3 and a shutter 25, with all the mentioned components being disposed on a common optical axis which is also an exposure optical axis.

A scanner 10 for reading the image formed on the film 2 is disposed upstream in the film transporting path relative to the optical exposure unit 20. This scanner 10 irradiates white light beam on the film 2, decomposes its reflected or transmitted light into the RGB three primary color components, whose respective densities are determined by means of a CCD line sensor or a CCD image sensor or the like. The image information read by the scanner 10 is then transmitted to the controller 7, in which the information is utilized for generating a simulated video image corresponding to the photographic image to be formed on the exposed print paper 3, which former image is displayed on the video monitor 9.

Figure 2:
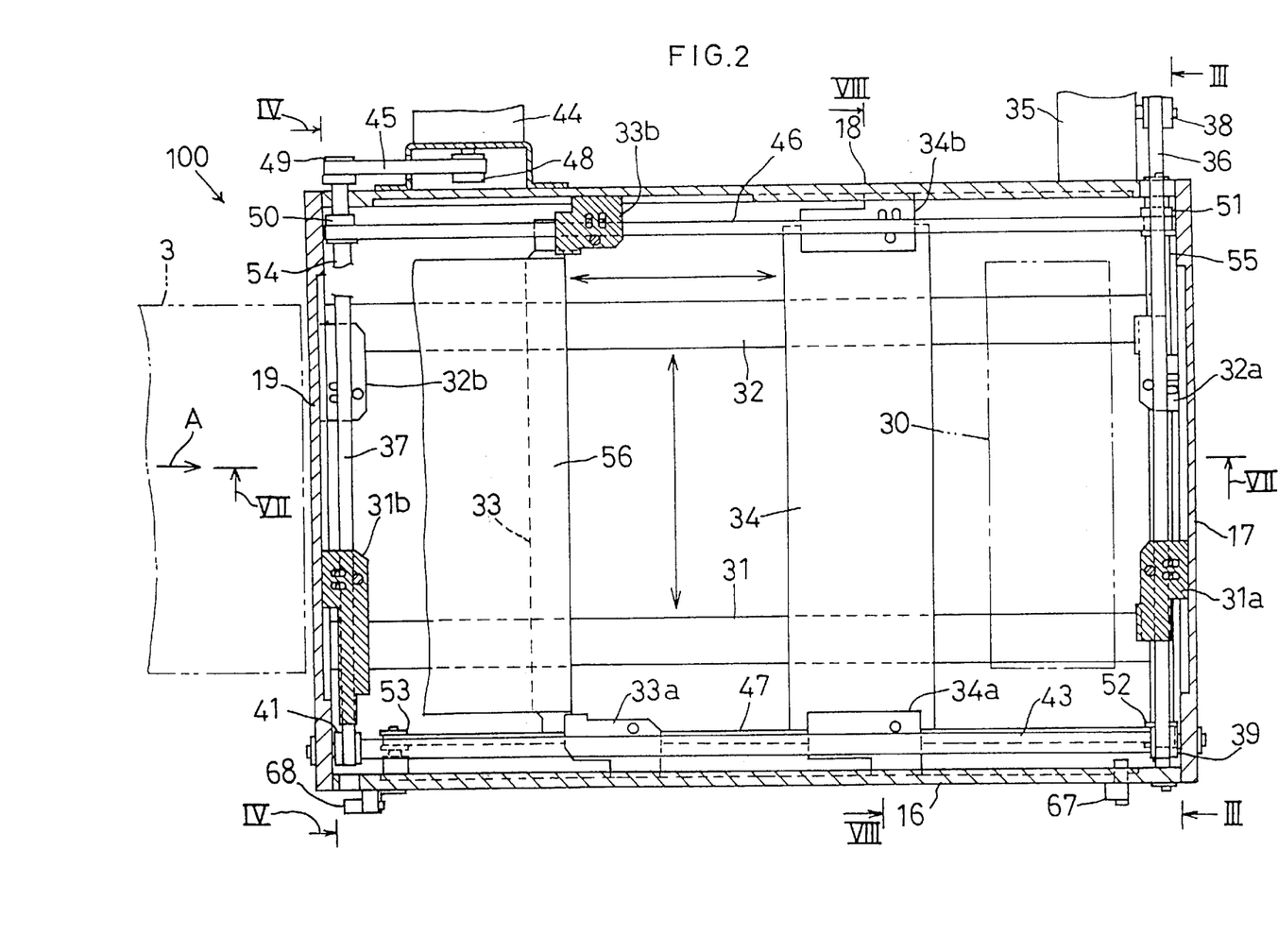
FIG. 2 is a plan view showing a masking mechanism and a VFPH module.

At the common exposure point 1 of the optical and digital exposure units 20, 30 provided on the exposure table 70, there is provided a masking mechanism 100, as shown in FIG. 2. This masking mechanism 100 has its respective components generally accommodated within a rectangular frame-like assembly consisting of a first frame member 16, a second frame member 17, a third frame member 18 and a fourth frame member 19. For setting or delimiting the two-dimensional extension of the image to be formed on the print paper 3, the mechanism includes a pair of width-wise masking plates 31, 32 and a pair of feeding-wise masking plates 33, 34. The width-wise masking plates 31, 32 function to delimit the width-wise dimension of the exposure area normal to the transporting path, whereas the feeding-wise masking plates 33, 34 function to delimit the dimension of the exposure area along the transporting path.

Figure 3:
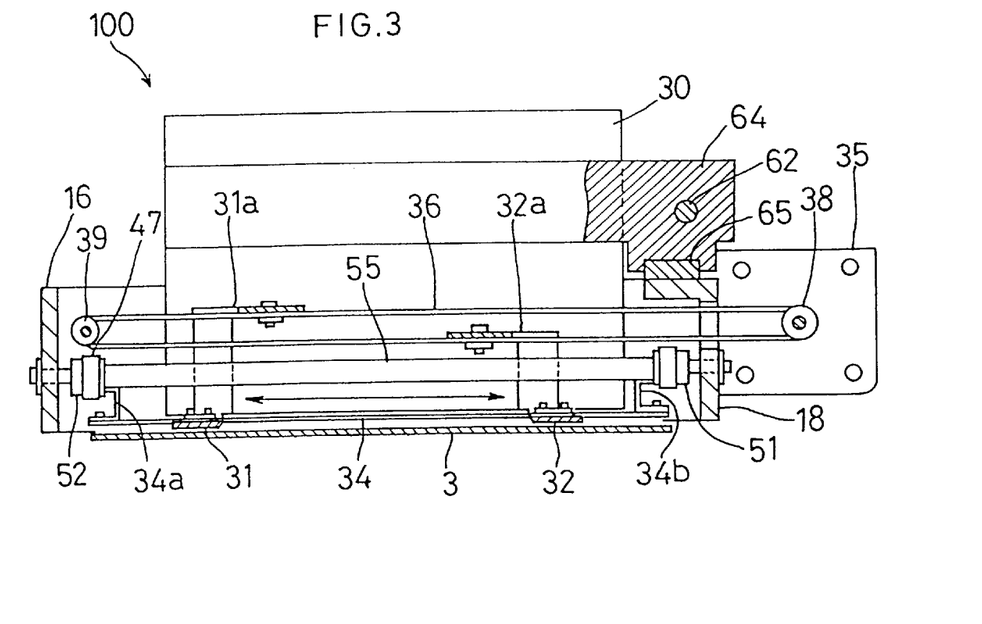
FIG. 3 is a section view taken along a line III—III in FIG. 2 showing a portion of the masking mechanism located downstream in a transporting path.

A driving mechanism for driving the width-wise masking plates 31, 32 includes a drive motor 35, and a pair of synchronizing belts 36, 37 disposed at the opposed ends of the width-wise masking plates 31, 32. The one synchronizing belt 36 is entrained about a drive pulley 38 of the drive motor 35 and a first pulley 39 (see FIG. 3). The synchronizing belt 37 is entrained about a second pulley 41 and a tension pulley 42. The first pulley 39 and a second pulley 41 are secured at the opposed ends of a masking-plate driving shaft 43, which in turn is mounted via bearings to the second frame member 17 and the fourth frame member 19. The tension pulley 42 is attached to the fourth frame member 19. The width-wise masking plate 31 is attached via a pair of connecting plates 31a, 31b to upper portions of the width-wise masking plate synchronizing belts 36, 37. The width-wise masking plate 32 is attached via a pair of connecting plates 32a, 32b to lower portions of the masking-plate synchronizing belts 36, 37 (see FIGS. 3 and 4).

With the construction above, the drive of the drive motor 35 rotates the drive shaft 43 via the synchronizing belt 36 and rotates also the synchronizing belt 37. That is, the pair of synchronizing belts 36, 37 are driven to rotate simultaneously and in the same direction, thereby to open/close the pair of width-wise masking plates 31, 32.

Figure 4:
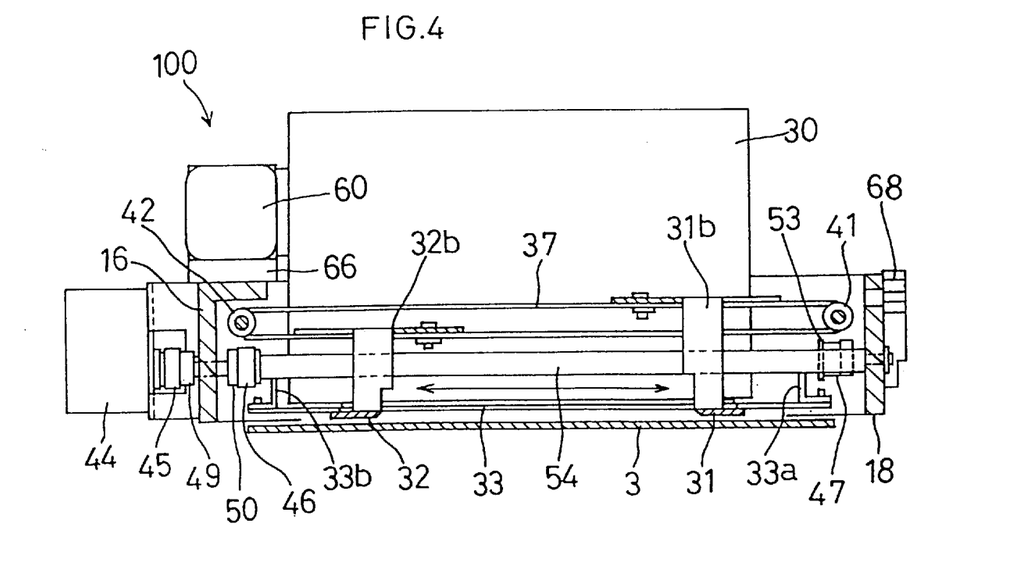
FIG. 4 is a section view taken along a line IV—IV in FIG. 2 showing a further portion of the masking mechanism located upstream in the transporting path.
Figure 5:
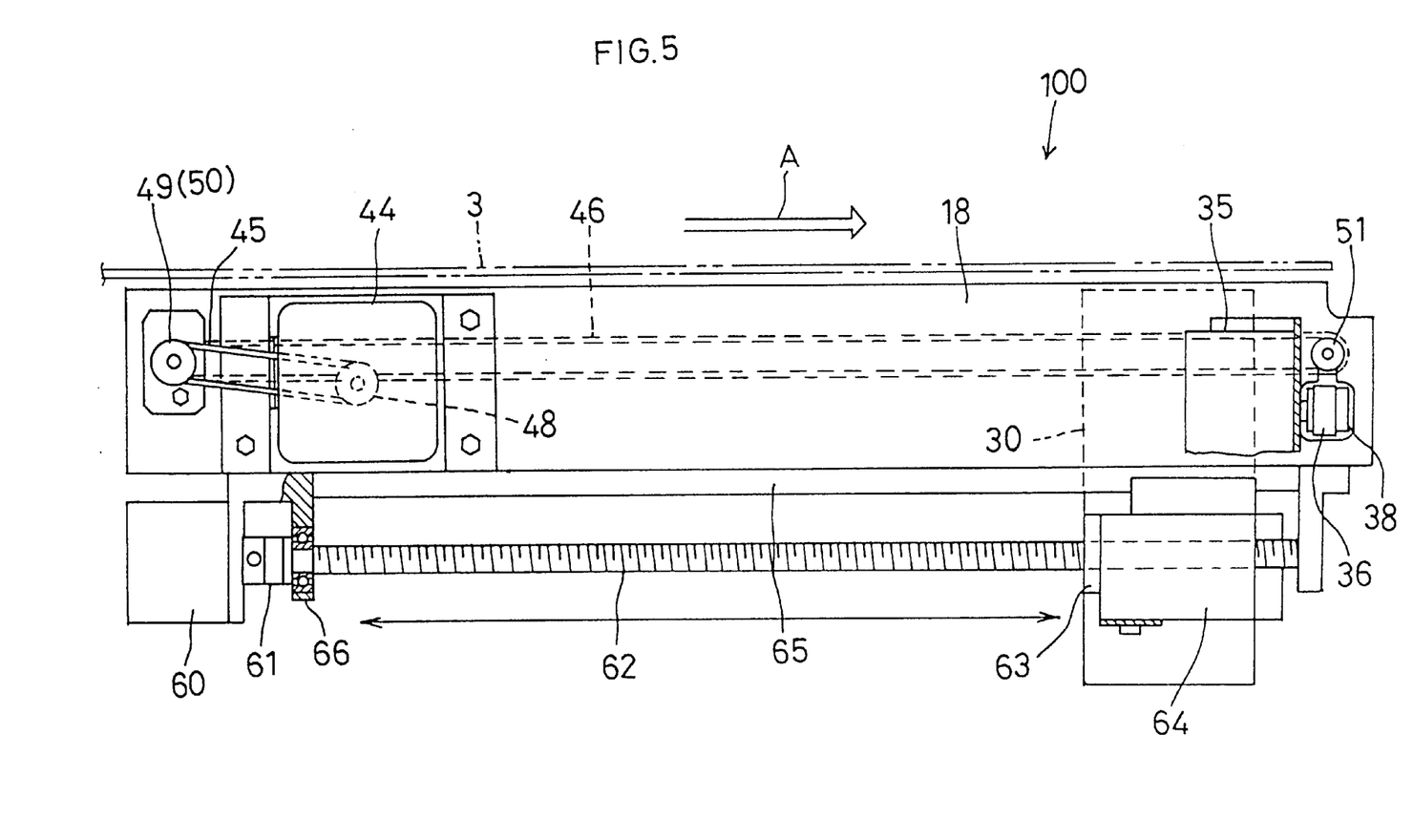
FIG. 5 is a frontal elevation showing the masking mechanism and the VFPH module.
Figure 6:
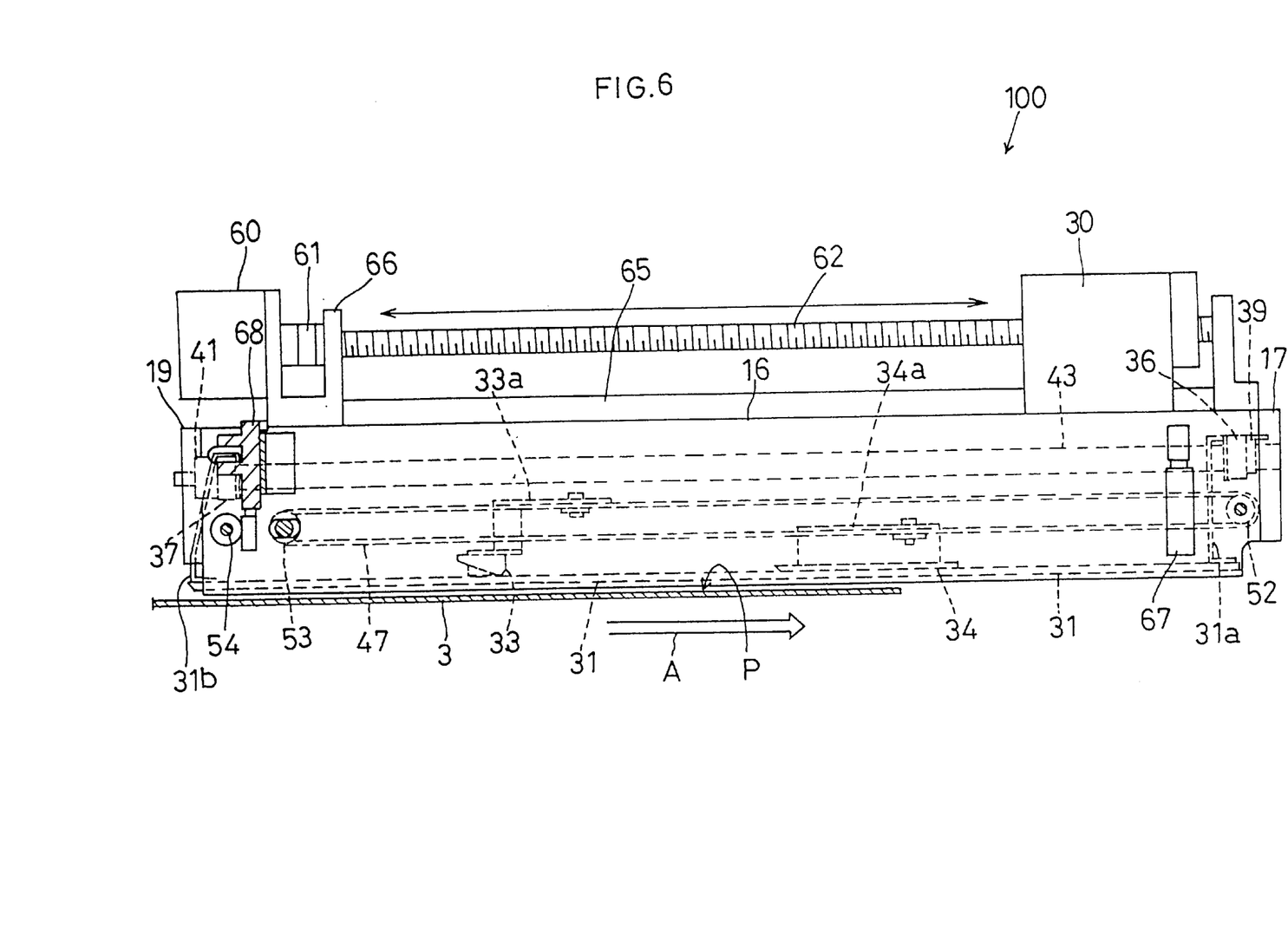
FIG. 6 is another frontal elevation showing the masking mechanism and the VFPH module vertically reversed relative to FIG. 5.

A drive mechanism for the feeding-wise masking plates 33, 34 includes a drive motor 44, and feeding-wise masking plate synchronizing belts 45, 46, 47 disposed at ends of the feeding-wise masking plates 33, 34. The synchronizing belt 45 is entrained about a drive a drive pulley 48 of the drive motor 44 and a third pulley 49 (see FIG. 5). The synchronizing belt 46 is entrained about a fourth pulley 50 and a fifth pulley 51. The synchronizing belt 47 is entrained about a sixth pulley 52 and a tension pulley 53 (FIG. 6). The third pulley 49 and the fourth pulley 54 are secured to one end of the feeding-wise masking plate drive shaft 54, with the third pulley 49 being disposed on the outer side (FIG. 4). The fifth pulley 51 and the sixth pulley 52 are secured to the opposed ends of a feeding-wise masking plate drive shaft 55. The shafts 54, 55 are mounted via bearings to the first frame member 16 and the third frame member 18. The tension pulley 53 is attached to the first frame member 16. The feeding-wise masking plate member 33 is attached via a pair of connecting plates 33a, 33b to upper portions of the feeding-wise masking plate synchronizing belts 46, 47 and the feeding-wise masking plate 34 is attached via a pair of connecting plates 34a, 34b to lower portions of the feeding-wise masking plate synchronizing belts 46, 47 (FIG. 6).

Figure 7:
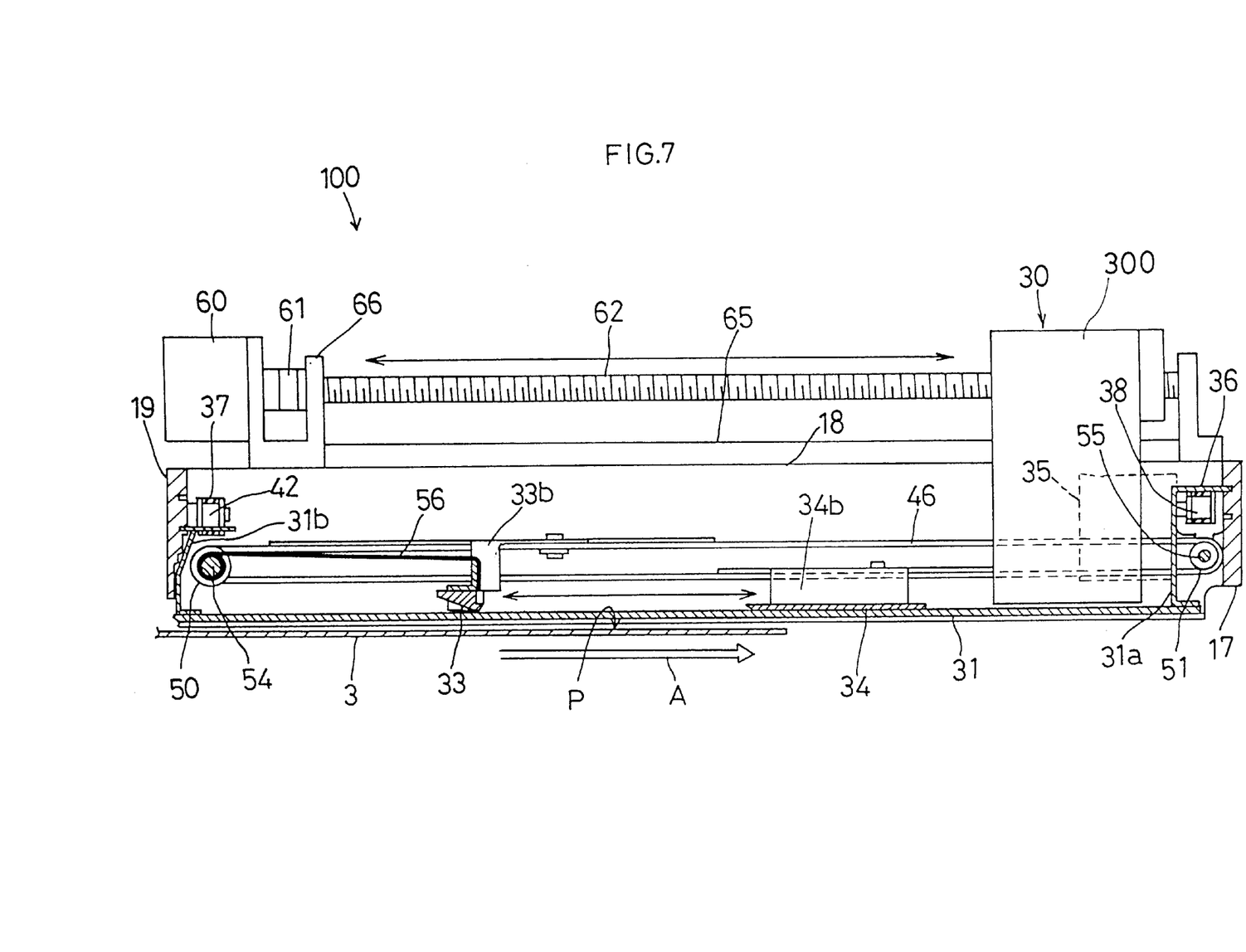
FIG. 7 is a section taken along a line VII—VII in FIG. 2 showing the masking mechanism and the VFPH module.

With the construction above, the drive of the motor 44 drives the synchronizing belt 45 to rotate the shaft 54, whereby the synchronizing belt 46 is driven to rotate so as to rotate the synchronizing belt 47 via the shaft 55. With this, the feeding-wise masking plates 33,34 are opened/closed As shown in FIG. 7, to the feeding-wise masking plate 33 disposed upstream in the transporting path, there is attached one end of a masking curtain 56, whose other end is entrained about the shaft 54. In FIG. 2, when the feeding-wise masking plate 33 is moved to the right, the masking curtain 56 is paid out. When the plate 33 is moved to the left, the curtain 56 is retracted to be wound about the shaft 54. The other feeding-wise masking plate 34 disposed downstream in the transporting path does not have such masking curtain, but has an extended width instead.

Figure 9:
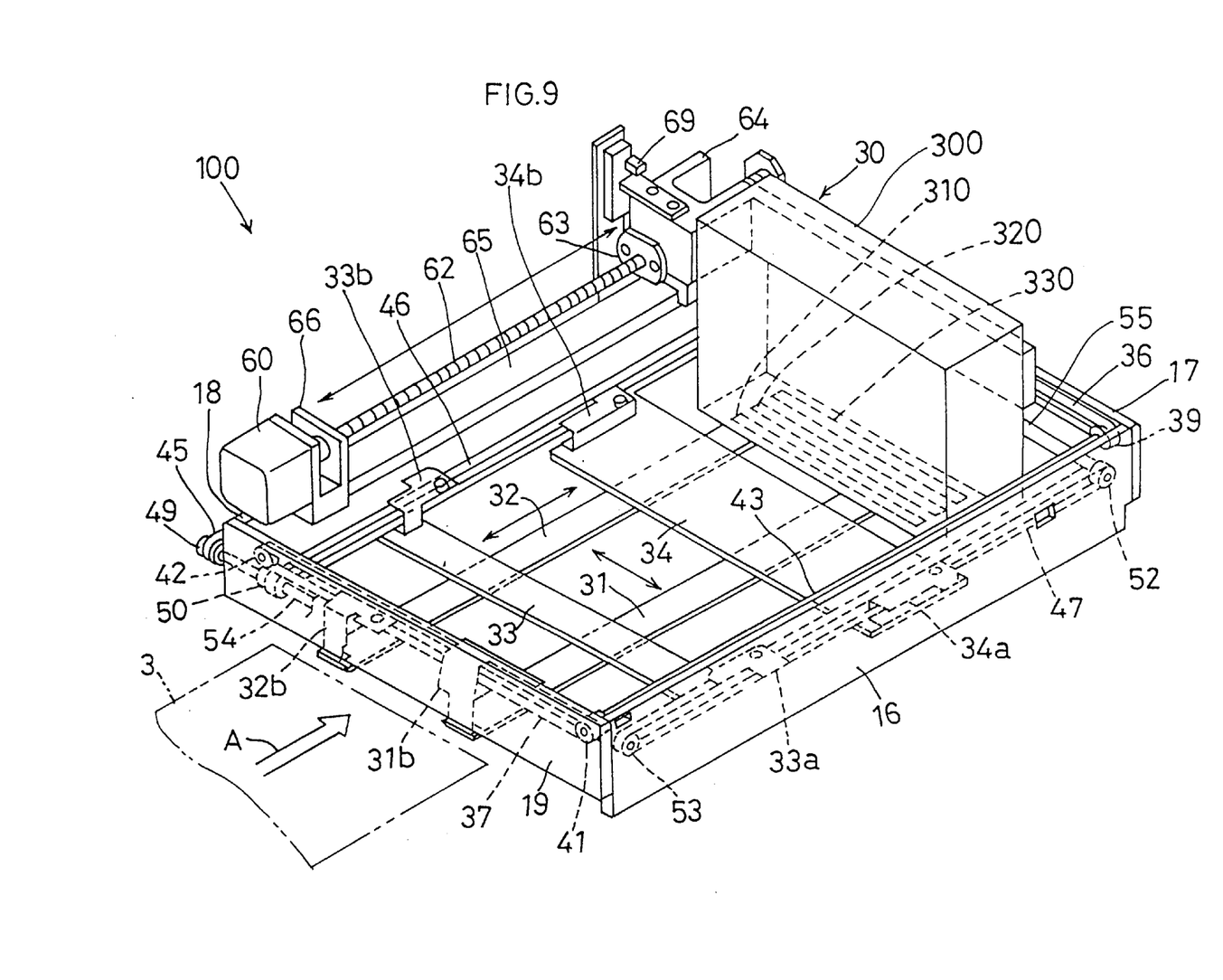
FIG. 9 is a perspective view showing on the right-hand side of the masking mechanism and the VFPH module on the transporting path.

Next, a mechanism for driving the digital exposure unit 30 in the auxiliary scanning direction will be described. As shown in FIGS. 7 and 9, this mechanism includes a drive motor 60, a coupling 61 mounted on a motor shaft, a ball screw 62 operatively coupled with the drive motor 60 via the coupling 61, a nut holder 64 mounting a ball nut 63 engageable with the ball screw 62 and a linear rail 65 on which the nut holder 64 is slid. A head module 300, a major component of the digital exposure unit 30, is attached cantilever-wise to the nut holder 64. The drive motor 60 is secured to a motor mount 66, which in turn is attached to the third frame member 18. The ball screw 62 has its opposed ends supported by the motor mount 6 and the third frame member 18. In the construction above, a combination of a shaft and a slide metal member or the like may be used in place of the linear rail 65. Further, a trapezoidal screw or the like may be employed as the feeding screw.

Figure 8:
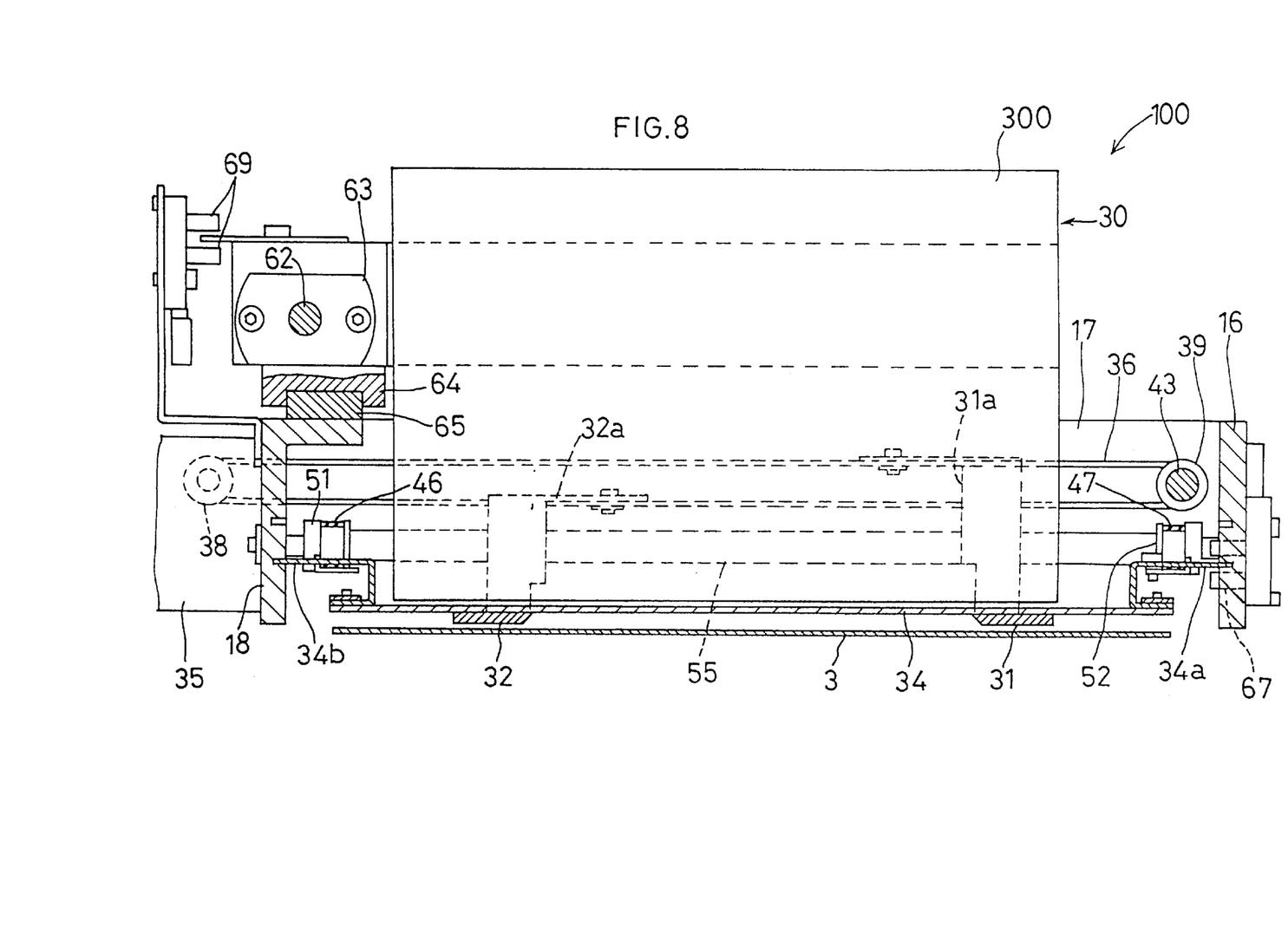
FIG. 8 is a section taken along a line VIII—VIII in FIG. 2 showing the VFPH module.

As shown in FIG. 8, immediately above a print-paper transporting plane P, there are disposed the width-wise masking plates 31, 32, immediately above which are disposed the feeding-wise masking plates 33, 34, immediately above which is disposed a beam irradiating plane of the head module 300. As may be understood from the above, the optical exposure unit 20 and the digital exposure unit 30 are operable independently of each other.

Sensors are provided for controlling activation of the respective exposure units described above. A first sensor 67 is provided for detecting a maximally opened position of the feeding-wise masking plates 33, 34, which position comprises the original position of this first sensor 67. A second sensor 68 is provided for detecting a maximally opened position of the width-wise masking plates 31, 32, which position comprises the original position of this second sensor 68. A third sensor 69 is provided for detecting a position where the head module 300 of the digital exposure unit 30 is moved most downstream along the transporting path, which position comprises the original position of this third sensor 69. In the instant embodiment, all of these sensors are provided as optical sensors. However, other types of sensors may be employed as well.

Figure 10:
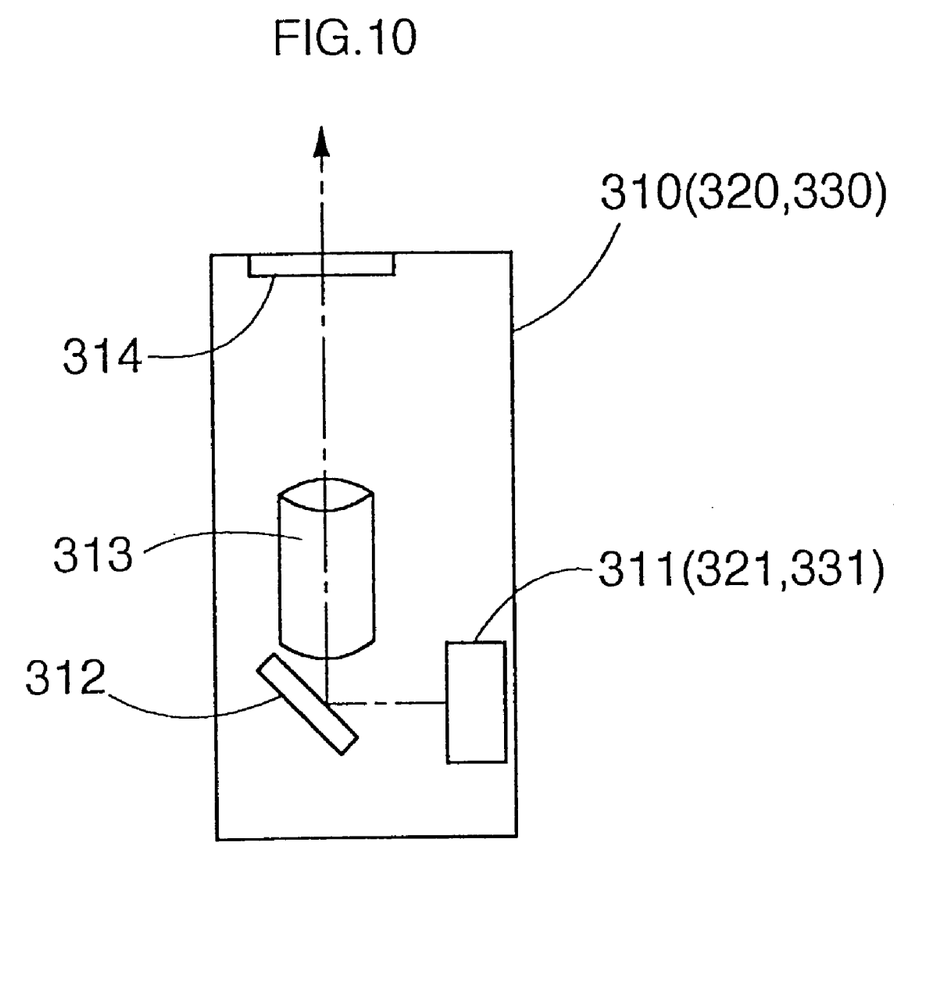
FIG. 10 is a schematic of a print head.

The head module 300 of the digital exposure unit 30 consists essentially of a red-component printer head 310 including a first vacuum fluorescence print head ('VFPH') 320 for effecting exposure of red component, a green-component printer head 320 including a second VFPH 321 for effecting exposure of green component and a blue-component printer head 330 including a third VFPH 331 for effecting exposure of blue component. The first VFPH 311 has an emission wavelength range of 600–750 nm with a peak of 670 nm. The second and third VFPH's 321, 331 respectively have an emission wavelength range of 400–580 nm with a peak of 505 nm. Each of these VFPH's is constructed from a number of fluorescence elements assembled as a narrow elongated linear array having a length corresponding to the width of the print paper 3 and providing an image resolution of 200 dpi approximately. As shown in FIG. 10, the red-component printer head 310, for example, is an assembly of a mirror 312 for reflecting by 90 degrees beam emitted from the first VFPH 311, a SELFOC lens 313 as an image forming optical unit and a color decomposing filter 314. Then, this red-component printer head 32 together with the green-component printer head 320 and the blue-component printer head 330 having substantially similar constructions are arranged in parallel and integrated together within a housing, thus providing the VFPH module 300. This VFPH module 300 is connected with the controller 7. Thus, as the VFPH module 300 is moved for scanning by the auxiliary scanning drive mechanism under the ON/OFF control by the controller 7 of the VFPH's 311, 321, 331, color exposure of image data and/or character data are effected on the print paper 3.

Figure 11:
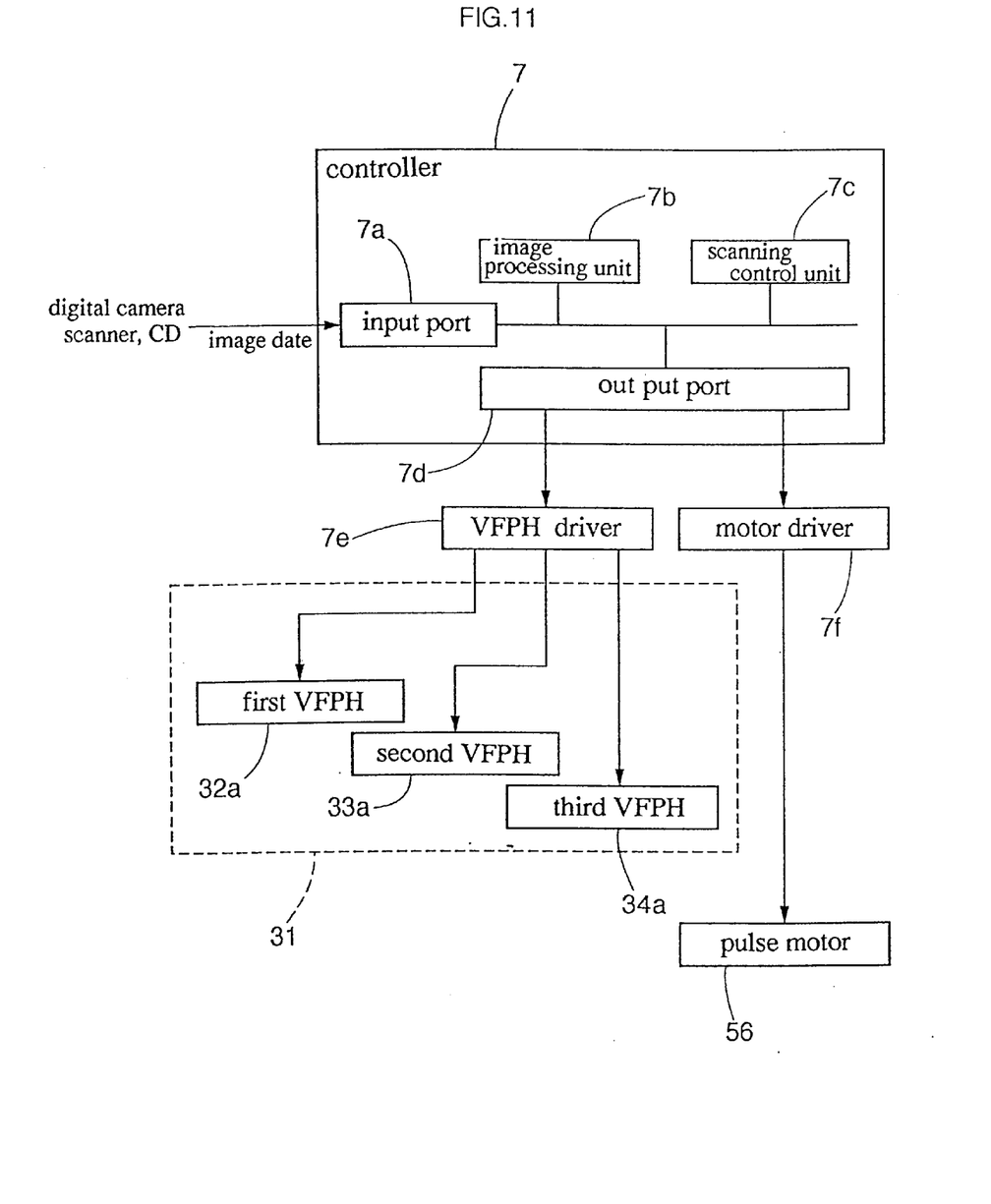
FIG. 11 is a block diagram schematically illustrating a digital exposure control.

FIG. 11 is a block diagram schematically illustrating the exposure control of the print paper 3 by the VFPH module 300. The controller 7 includes an image data input port 7a for obtaining digital data from various digital devices such as a digital camera, a scanner, a CD or the like, an image processing unit 7b for effecting image processing of the inputted image data, bit-converted character data or the like according to the necessity and effecting also conversion of these processed data into print data to be outputted to the VFPH module 300, a scanning control unit 7c for generating control signals relating to the scanning speed and timing of the VFPH module 300, and an output port 7d for outputting various output data to an external device. The print data described above are transmitted via a VFPH driver 7e to the respective VFPH's 311, 321, 331, whereas the control signals are transmitted via a motor driver 7f to a pulse motor 60.

Next, with reference to FIG. 12, there will be described a construction for attaching the mask mechanism 100 including the VFPH module 300 to the exposure table 70. Incidentally, in FIG. 12, the constructions of such components as the masking plates are eliminated from the view for better understanding. An arrow A as shown denotes the transporting direction of the print paper.

The exposure table 70 includes a unit positioning block 71, a connector 72, a unit receiving guide 73 disposed downstream, and a further unit receiving guide 74 disposed upstream. The unit positioning block 71, at two positions thereof, includes positioning holes 71a, 71b. The guides 73, 74 respectively include tapered portions 73a, 74a for facilitating attachment of the mask mechanism 100. Further, on the lower side of the exposure table 70 on the right-hand side relative to the transporting path, there are provided a pair of fastener attaching plates 75, 76 and a pair of positioning pins 77, 78. A conveyer belt 86 is provided centrally of the exposure table 70.

On the other hand, the mask mechanism 100 includes a guide rail 79 engageable with the unit receiving guide 73, a further guide rail 84 engageable with the unit receiving guide 74, a pair of positioning pins 80, 81 attached to the third frame member 18 for registered engagement with the positioning holes 71a, 71b, a pair of positioning holes 16a, 16b defined in the first frame member 16 for registered engagement with the positioning pins 77, 78, a connector 85 including signal transmitting elements or the like, and a pair of through holes 16c, 16d into which fasteners 82, 83 are inserted for securing the masking mechanism 100 to the exposure table 70. The controller 7 transmits signals via the connectors 72, 85 for controlling movements of the respective components.

Figure 12:
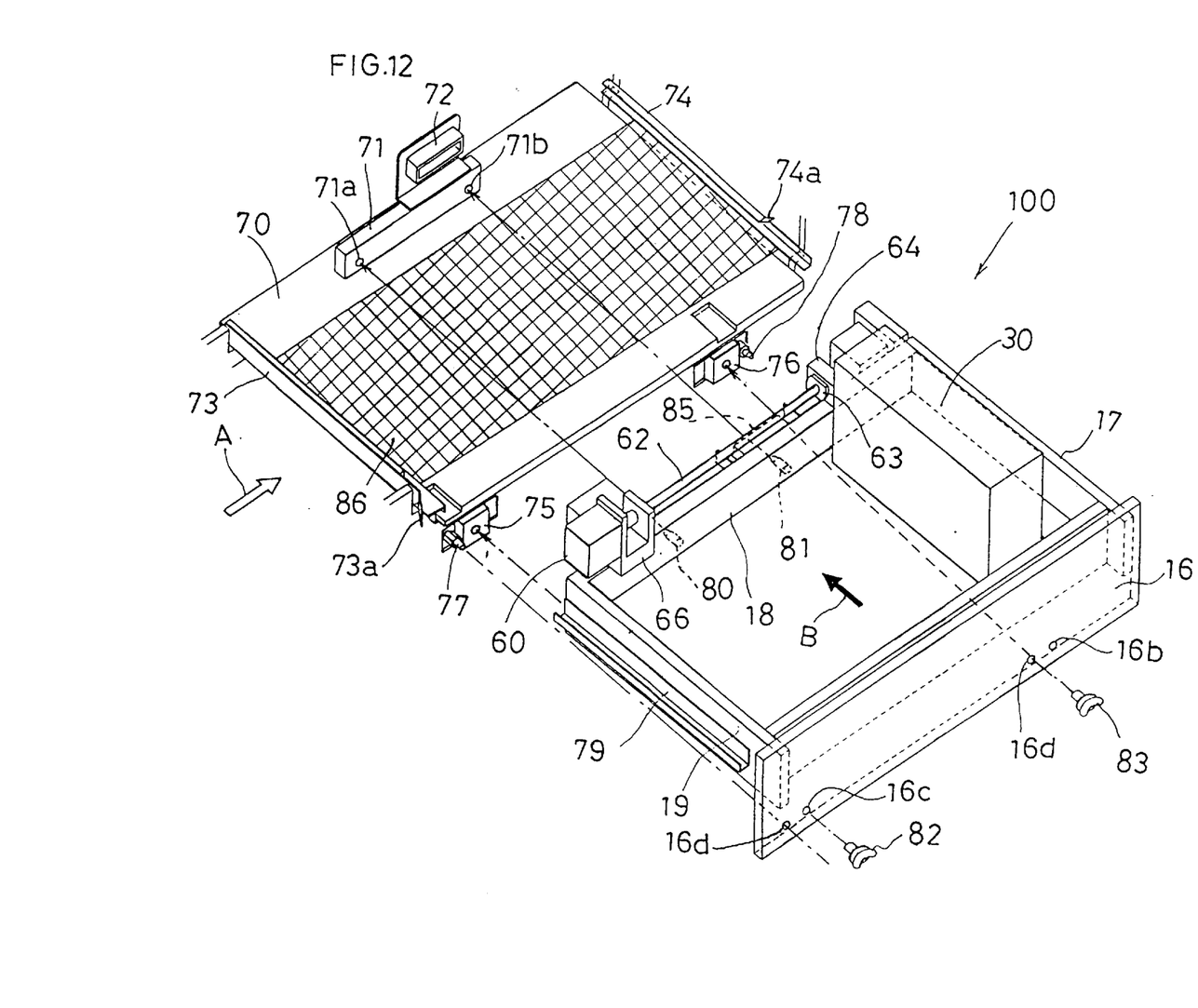
FIG. 12 is a view showing an attaching construction for attaching the image forming apparatus on an exposure table.
Figure 13:
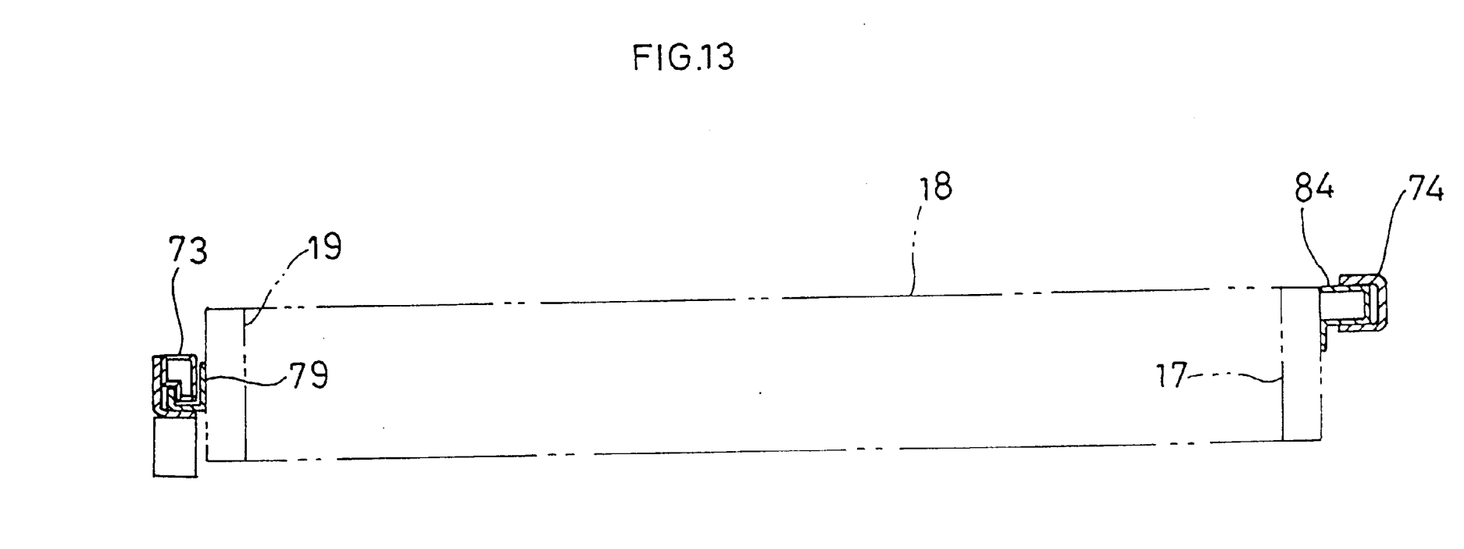
FIG. 13 is a view showing constructions of guide portions of the image forming apparatus and the exposure table.

For attaching the masking mechanism 100 to the exposure table 70, the mechanism is slid along a direction of arrow B in FIG. 12. FIG. 13 shows the construction of the guide unit after completion of the attachment.

Next, the function of the printer processor described above mill be described schematically.

When the film 2 is fed to the optical exposure unit 20 by means of the rollers 11 driven by the motor 12, the controller 7 controls the beam modulating filter 22 according to the image information of the film 2 read by the scanner 10, so as to adjust the color balance according to the color component densities of the image of the film 2. Then, the optical exposure unit 20 irradiates the film 2 with this modulated beam, and the beam transmitted through the film 2 thus bearing the image information of the film 2 is irradiated onto the print paper 3 located at the exposure point 1, so that the image of the film 2 is printed on the print paper 3. When necessary, in the periphery of the area of the printed paper 3 printed by the optical exposure unit 20, additional images of characters, logo marks or the lie are printed by scanning of the VFPH module 300 of the digital exposure unit 30. Needless to say, when an image recorded by a digital camera is to be printed on the print paper 3, the print paper 3 located at the exposure point 1 is subjected to exposure by the digital exposure unit 30 alone.

The print paper 3 printed with image at the exposure point 1 is then transported to the developer unit 5 and subjected to an image developing process as the paper 3 is caused to go through a plurality of tanks charged with liquids for developing the print paper 3.

When the optical exposure unit 20 is used for effecting an optical printing operation for a maximal size, the width-wise masking plates 31, 32 and the feeding-wise masking plates 33, 34 are set at the respective maximally opened positions. In this case, the digital exposure unit 30 is located on the right-most side in FIG. 2 and maintained still immediately above the feeding-wise masking plate 34. In the case of a printing operation for obtaining a print smaller than the maximal size, the respective masking plates 31–34 are moved to delimit a desired exposure area.

In the case of a digital exposure operation, the respective masking plates 31–34 are set to the respective maximally opened positions and then the digital exposure unit 30 is slid to effect exposure. This digital exposure operation is normally effected one way, and the reverse movement of the digital exposure unit 30 is accelerated so as to reduce the processing period. When a plurality of digital exposure operations are to take place continuously one after another, the digital exposure operation may be effected bi-directionally, i.e. reciprocating manner.

When a plurality of optical exposure operations are to take place one after another in small short sections of a single print paper 3 as a test printing operation, this is done with the feeding-wise masking plates 33, 34 being dosed by a predetermined amount. In doing this, a double exposure will result if the beam is irradiated to the sections immediately before or after each area. In order to avoid this, as shown in FIG. 7, the upstream feeding-wise masking plate 33 is provided with the masking curtain 56 and the downstream masking plate 34 is provided with the extended width so as to prevent the beam being irradiated onto these adjacent sections.

In the embodiment above, in order for the VFPH module 300 to expose a predetermined area of the print paper 3, this is done by moving the module 300 above and over the print paper. Instead, the exposure of a predetermined area is also possible by moving the print paper 3 while maintaining the VFPH module 300 fixed at the predetermined position at the exposure point 1. In this case, this movement of the print paper 3 may be realized by an operation of the print-paper transporting mechanism according to control signals transmitted from the scanning control unit 7c of the controller 7.

Although the present invention has been described with reference some particular embodiments, it is to be understood that these embodiments are merely illustrative of the application of the principles of the invention. Numerous modifications may be made therein and other arrangements may be devised without departing from the spirit and scope of the invention.

What is claimed is:

1. An image forming apparatus comprising:

an optical exposure unit for exposing photosensitive material at an exposure point with light beam generated from a first light beam source and transmitted through a photographic film to form an image on the photosensitive material; and a digital exposure unit for forming an image on the photosensitive material at said exposure point by exposing the photosensitive material with a light beam generated from a second light beam source according to digital image data, said digital exposure unit comprising: a digital exposure head module in the form of a linear array and used as said second light beam source, said linear array extending in a main scanning direction; and an auxiliary scanning direction driving mechanism for driving said digital exposure head module in an auxiliary scanning direction traversing said main scanning direction to cause the photosensitive material at said exposure point to be exposed by said digital exposure head module.

2. An image forming apparatus according to claim 1, wherein said auxiliary scanning direction driving mechanism comprises a drive motor, a holder for supporting said digital exposure head module, and a linear moving mechanism for converting a rotation of said drive motor into a linear movement to drive said holder in said auxiliary scanning direction.

3. An image forming apparatus according to claim 2, wherein said digital exposure head module comprises a vacuum fluorescence print head (VFPH) module having a first VFPH for red exposure, a second VFPH for green exposure and a third VFPH for blue exposure.

4. An image forming apparatus according to claim 2, wherein said optical exposure unit comprises a masking mechanism delimiting an exposure area on the photosensitive material, and wherein said masking mechanism and said auxiliary scanning direction driving mechanism are integrated together as a unit.

5. An image forming apparatus according to claim 4, wherein said masking mechanism comprises a width-wise masking member for determining a width-wise dimension of said exposure area and a feeding-wise masking member for determining a dimension of said exposure area in said auxiliary scanning direction, said auxiliary scanning direction driving mechanism being movable independently of movements of said width-wise masking member and said feeding-wise masking member.

6. An image forming apparatus according to claim 4, wherein said masking mechanism is detachably attached on a transporting path along which the photosensitive material is transported.

7. An image forming apparatus according to claim 3, wherein said first VFPH has an emission wavelength of 600–750 mm and wherein said second VFPH and said third VFPH each have an emission wavelength of 400–580 mm.

8. An image forming apparatus comprising:

an optical exposure unit for exposing photosensitive material which has been transported by a photosensitive material transporting mechanism to an exposure point with a light beam generated from a first light beam source and transmitted through a photographic film to form an image on the photosensitive material; and a digital exposure unit for forming an image on the photosensitive material at said exposure point by exposing the photosensitive material with a light beam generated from a second light beam source according to digital image data, said digital exposure unit comprising a digital exposure head module in the form of a linear array and used as said second light beam source, said linear array extending in a main scanning direction traversing a transporting direction of the photosensitive material; and an auxiliary scanning direction driving mechanism for driving said photosensitive material to said digital exposure head module in an auxiliary scanning direction traversing said main scanning direction to cause the photosensitive material at said exposure point to be exposed by said digital exposure head module, wherein said auxiliary scanning direction driving mechanism comprises said photosensitive material transporting mechanism.

9. An image forming apparatus according to claim 8, wherein said digital exposure head module comprises a vacuum fluorescence print head (VFPH) module having a first VFPH for red exposure, a second VFPH for green exposure and a third VFPH for blue exposure.

* * * * *

UNITED STATES PATENT AND TRADEMARK OFFICE
CERTIFICATE OF CORRECTION

PATENT NO. : 6, 025, 904
DATED : Feb. 15, 2000
INVENTOR(S) : Kiyonaga et al.

It is certified that error appears in the above-identified patent and that said Letters Patent is hereby corrected as shown below:

In the cover page, in the section entitled References, U.S. Patent Docs., line 2, change "9/1998" to - - 9/1988 - -.
In column 2, line 34, after the word "VFPH" delete the comma.
In column 5, line 54, delete "a drive" because it is repeated twice.
In column 6, line 11, change "open/dosed" to - - open/closed - -.
In column 6, line 11, start a new paragraph with the word - - As - -.
In column 8, line 14, change "mill" to - - will - -.
In column 8, line 29, change "lie" to - - like - -.

Signed and Sealed this

Eighth Day of May, 2001

Attest:

NICHOLAS P. GODICI

Attesting Officer

Acting Director of the United States Patent and Trademark Office